United States Patent
McGlynn

[19]

[11] Patent Number: 5,825,493
[45] Date of Patent: Oct. 20, 1998

[54] COMPACT HIGH RESOLUTION INTERFEROMETER WITH SHORT STROKE REACTIONLESS DRIVE

[75] Inventor: Charles L. McGlynn, Brookfield, Conn.

[73] Assignee: Raytheon Company, Lexington, Mass.

[21] Appl. No.: 671,469

[22] Filed: Jun. 28, 1996

[51] Int. Cl.$^6$ ........................................... G01B 9/02
[52] U.S. Cl. ............................... 356/346; 356/358
[58] Field of Search ................... 356/346, 358, 356/345

[56] References Cited

U.S. PATENT DOCUMENTS

| 5,148,235 | 9/1992 | Tank et al. | 356/346 |
| 5,331,399 | 7/1994 | Tank et al. | 356/346 |

FOREIGN PATENT DOCUMENTS

| 58-169004 | 10/1983 | Japan | 356/358 |

*Primary Examiner*—Robert Kim
*Attorney, Agent, or Firm*—W. C. Schubert; G. H. Lenzen, Jr.

[57] ABSTRACT

An interferometer or spectrometer having a short stroke reactionless drive mechanism is disclosed. The interferometer includes a housing, and a beamsplitter for reflecting an input beam along a fixed optical path and for transmitting the input beam along a scanned optical path. A nonmoving reflecting arrangement is disposed along the fixed optical path and includes first and second nonmoving mirrors disposed to reflect the input beam multiple times therebetween, and a backreflecting device disposed at a final bounce position of the input beam to return the optical beam back to the beamsplitter. A scanning mechanism is disposed along the scanned optical path that includes third and fourth mirrors supported by flexible members or flexure blades that are coupled to the housing, and a backreflecting device at a final bounce position of the input beam to return the optical beam back to the beamsplitter. The drive mechanism is coupled to the third and fourth mirrors of the scanning mechanism for driving the respective mirrors so that the optical path difference of the scanned optical path is either increased or decreased relative to the fixed optical path. The backreflecting devices may comprise retroreflectors or flat mirrors, for example. The drive mechanism may comprise linear actuators, such as voice coil motors, or the like.

11 Claims, 1 Drawing Sheet

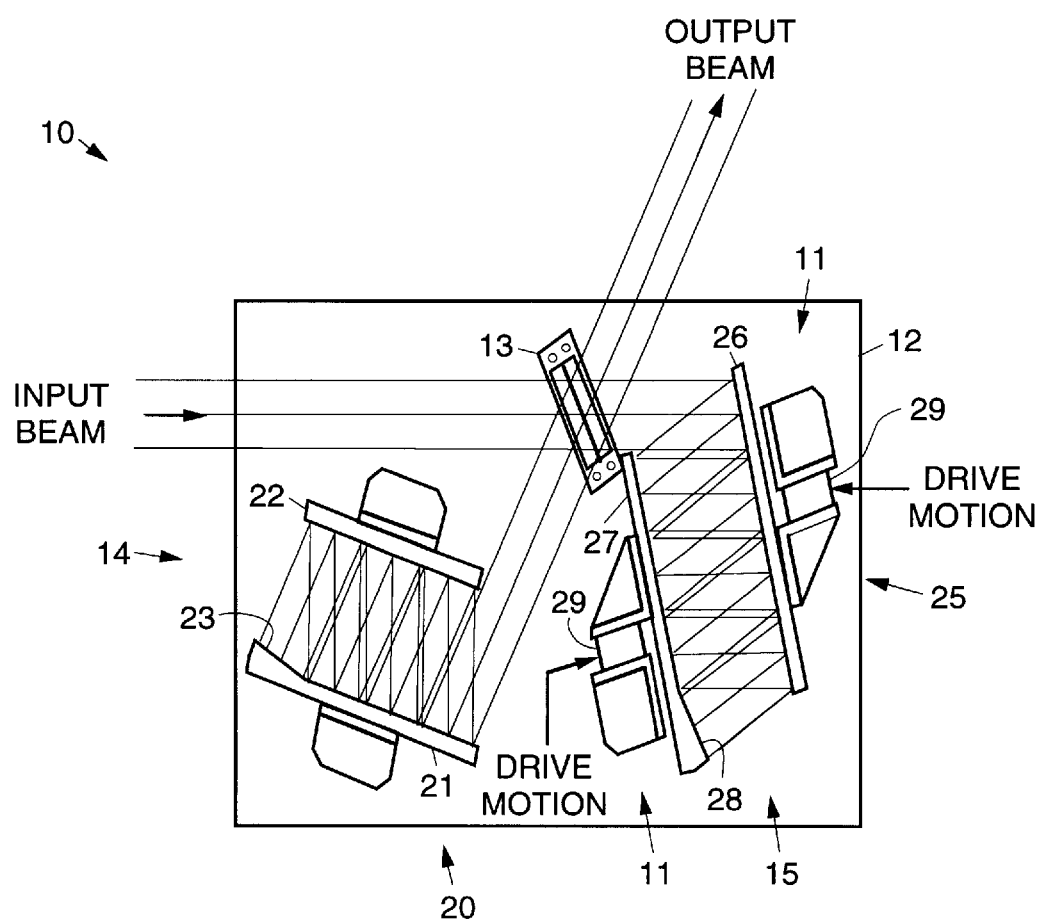

COMPACT HIGH RESOLUTION INTERFEROMETER WITH SHORT STROKE REACTIONLESS DRIVE

BACKGROUND OF THE INVENTION

The present invention relates generally to interferometers, and more particularly, to an interferometer having a short stroke reactionless drive.

Interferometers having a 0.5 wavenumber resolution require an optical path difference (OPD) scan length of about two centimeters. The scan length corresponds to 1/resolution in centimeters. Typically for a two centimeter OPD scan length, the required mechanical scan distance is one centimeter for a single scanned fold flat with the mirror normal parallel to the optical axis or up to four times less with complex optical systems in double pass. The large scan distance necessitates the use of air bearings which are not compatible with vacuum applications, ball bearings which create scan noise or flex pivots which have unsatisfactory structural stiffness.

Thus, prior systems suffered from relatively large scan distances, complex optical systems and the inherent problems such as scan noise from ball bearings, vibration from the flex pivot supported arms or high cost and tight optical tolerances.

Accordingly, it is an objective of the present invention to provide for an improved interferometer that overcomes the limitations of conventional systems.

SUMMARY OF THE INVENTION

To meet the above and other objectives, the present invention provides for an interferometer or spectrometer having a short stroke reactionless drive mechanism that improves upon conventional interferometer designs. The interferometer includes a housing, and a beamsplitter for reflecting an input beam along a fixed optical path and for transmitting the input beam along a scanned optical path. A nonmoving reflecting arrangement is disposed along the fixed optical path and includes first and second nonmoving mirrors disposed to reflect the input beam multiple times therebetween, and a backreflecting device disposed at a final bounce position of the input beam to return the optical beam back to the beamsplitter. A scanning mechanism is disposed along the scanned optical path that includes third and fourth mirrors supported by flexible members, such as flexure blades, that are coupled to the housing, and a backreflecting device at a final bounce position of the input beam to return the optical beam back to the beamsplitter. A drive mechanism is coupled to the third and fourth mirrors of the scanning mechanism for driving the respective mirrors so that the optical path difference of the scanned optical path is either increased or decreased relative to the fixed optical path. The backreflecting devices may comprise retroreflectors or flat mirrors, for example. The drive mechanism may comprise linear actuators, such as voice coil motors, or the like.

The scan distance (ΔOPD) for the interferometer or spectrometer is directly related to the required spectral resolution of the instrument. The interferometer has a large optical to mechanical advantage which reduces the scan distance by the number of reflections times four (32 to 1 in a preferred embodiment). The large opto-mechanical advantage reduces the scan distance commensurate with low stress, long life flexure blades, for example, and a light weight reactionless scan mechanism. A reduced to practice embodiment of the interferometer requires a mechanical scan length of 0.062 centimeters for a one wavenumber instrument.

The use of two flat mirrors and high stiffness flexible blades as part of the drive mechanism reduces the optical complexity and provides an extremely smooth scan. The present invention has a large opto-mechanical advantage and permits the use of flexure blades traveling only 0.062 (±0.031) centimeters at the end of the blade, thereby, exhibiting extended life, high stiffness and extremely smooth scanning.

The present invention may be used with any scanning Fourier transform spectrometer (FTS) interferometer. It is especially useful in applications that are intended for aircraft, spacecraft or vacuum environments, and where a reactionless mechanism is required or where volume and weight budgets are tight.

The present invention utilizes two flat mirrors supported by flexure blades within the scanned leg of the interferometer. The flat mirrors are driven such that the optical path difference (OPD) of the interferometer is either increased or decreased relative to the fixed leg of the interferometer. By driving both mirrors and having multiple bounces per mirror the mechanical motion necessary to provide large optical path difference motion is greatly reduced.

For example, a preferred embodiment of the system that was reduced to practice has four bounces per mirror or eight off the two mirrors and in double pass (reflects back through the system off of the flat mirror that is disposed normal to the beam or retroreflector whichever is utilized) 16 bounces plus the path doubling at each bounce (in/out at each reflection). This provides for a 32 increment OPD change for 1 increment mechanical change.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which the sole drawing FIGURE illustrates an interferometer in accordance with the principles of the present invention.

DESCRIPTION OF THE PREFERRED EMBODIMENTS

Referring to the sole drawing FIGURE, it illustrates an interferometer 10 or spectrometer 10 in accordance with the principles of the present invention that has a short stroke reactionless drive mechanism 11. The interferometer 10 includes a housing 12, and a beamsplitter 13 disposed in the housing 12 for reflecting an input beam along a fixed optical path 14 and for transmitting the input beam along a scanned optical path 15.

A nonmoving reflecting arrangement 20 is disposed along the fixed optical path 14 that includes first and second nonmoving mirrors 21, 22 disposed to reflect the input beam multiple times therebetween, and a backreflecting device 23 disposed at a final bounce position of the input beam to return the beam back to the beamsplitter 13. A scanning mechanism 25 disposed along the scanned optical path 15 that includes third and fourth mirrors 26, 27 supported by flexible members 29, such as flexure blades 29, for example, that are coupled to the housing 12, and a backreflecting device 28 at a final bounce position of the input beam to return the optical beam back to the beamsplitter 13.

The drive mechanism 11 is coupled to the third and fourth mirrors 26, 27 of the scanning mechanism 25 for driving the respective mirrors 26, 27 so that the optical path difference of the scanned optical path 15 is either increased or decreased relative to the fixed optical path 14. The backreflecting devices 23, 28 may comprise retroreflectors or flat mirrors, for example. The drive mechanism 11 may comprise linear actuators, such as voice coil motors, or the like.

The scanning mechanism 25 preferably has two flat mirrors 26, 27 supported by the flexure members 29 or blades 29. The flat mirrors 26, 27 are driven such that the optical path difference (OPD) of the interferometer 10 is either increased or decreased relative to the fixed leg or optical path 14 of the interferometer 10. By driving both mirrors 26, 27 and having multiple bounces per mirror, the mechanical motion necessary to provide large optical path difference motion is greatly reduced.

Drive motion may be provided by linear actuators 31, such as voice coil motors, for example, whereby the moving coil portion of the motor moves in opposition to the magnet potion of the motor. By balancing masses of the components of each drive mechanism 11 and the mirror 26, 27 to which it is connected, the drive mechanism 11 can be made nearly reactionless, thereby imparting near zero torques on a host platform.

For example the interferometer 10 shown in the drawing FIGURE has four bounces per mirror, or eight off of the two mirrors 26, 27, and the light is double passed (reflects back through the interferometer 10 off of the flat mirror 28 or retroreflector 28 normal to the beam, whichever is utilized). Thus in the depicted embodiment of the interferometer 10, 16 bounces plus path doubling at each bounce (in/out at each reflection) is provided. This provides a 32 increment optical path difference change for 1 increment of mechanical change.

The spectral resolution of the reduced to practice embodiment of the interferometer 10 is 0.5 wavenumber (0.5 cm$^{-1}$). The optical scan distance to achieve 0.5 cm$^{-1}$ is 2 centimeters total or ±1 centimeters (±0.3937 inch). The mechanical scan distance for the interferometer 10 is ±$\frac{1}{32}$ (1 centimeters) or ±0.032 centimeters (±0.012 inch) For an interferometer 10 with a 2.54 centimeter beam diameter, the mirror size is approximately 3 centimeters wide by 12.7 centimeters long.

The retroreflector 28 or flat mirror 28 of the scanning mechanism 28 is located at the last bounce position to return the beam back through the interferometer 10. By utilizing a similar nonmoving two mirror arrangement in the fixed optical path 14 of the interferometer 10, a small compact interferometer cavity is produced with inherently high structural stiffness capability.

Thus, an improved compact interferometer has been disclosed. It is to be understood that the described embodiment is merely illustrative of some of the many specific embodiments which represent applications of the principles of the present invention. Clearly, numerous and varied other arrangements may be readily devised by those skilled in the art without departing from the scope of the invention.

What is claimed is:

1. An interferometer comprising:
   a housing;
   a beamsplitter disposed in the housing for reflecting an input beam along a fixed optical path and for transmitting the input beam along a scanned optical path;
   nonmoving reflecting means disposed along the fixed optical path that comprises first and second nonmoving mirrors disposed for reflecting the input beam multiple times therebetween, and backreflecting means disposed at a final bounce position of the input beam for returning the optical beam back to the beamsplitter;
   a scanning mechanism disposed in the housing and disposed along the scanned optical path that comprises third and fourth mirrors supported by flexible members that are coupled to the housing and backreflecting means disposed at a final bounce position of the input beam to return the optical beam back to the beamsplitter, and wherein the third and fourth mirrors reflect the input beam multiple times therebetween; and
   drive means coupled to the third and fourth mirrors of the scanning mechanism for driving the respective mirrors so that the optical path difference of the scanned optical path is either increased or decreased relative to the fixed optical path, the third and fourth mirrors and their respective drive means having balanced masses so that near zero torque is imparted to the housing.

2. The interferometer of claim 1 wherein the respective backreflecting means comprise retroreflectors.

3. The interferometer of claim 1 wherein the respective backreflecting means comprise flat mirrors.

4. The interferometer of claim 1 wherein the drive means comprises linear actuators.

5. The interferometer of claim 4 wherein the linear actuators comprise voice coil motors.

6. The interferometer of claim 1 wherein the flexible members comprise relatively stiff flexible blades.

7. An interferometer comprising:
   a housing;
   a beamsplitter disposed in the housing for reflecting an input beam along a fixed optical path and for transmitting the input beam along a scanned optical path;
   nonmoving reflecting means disposed along the fixed optical path that comprises first and second nonmoving flat mirrors disposed for reflecting the input beam multiple times therebetween, and backreflecting means disposed at a final bounce position of the input beam for returning the optical beam back to the beamsplitter;
   a scanning mechanism disposed in the housing and disposed along the scanned optical path that comprises third and fourth flat mirrors supported by flexible members that are coupled to the housing and backreflecting means disposed at a final bounce position of the input beam to return the optical beam back to the beamsplitter, and wherein the third and fourth mirrors reflect the input beam multiple times therebetween; and
   linear actuator means coupled to the third and fourth mirrors of the scanning mechanism for driving the respective mirrors so that the optical path difference of the scanned optical path is either increased or decreased relative to the fixed optical path the third and fourth mirrors and their respective linear actuator means having balanced masses so that near zero torque is imparted to the housing.

8. The interferometer of claim 7 wherein the respective backreflecting means comprise retroreflectors.

9. The interferometer of claim 7 wherein the respective backreflecting means comprise flat mirrors.

10. The interferometer of claim 7 wherein the linear actuator means comprise voice coil motors.

11. The interferometer of claim 7 wherein the flexible members comprise relatively stiff flexible blades.

\* \* \* \* \*